Nov. 6, 1923.
M. R. RUMFELT
1,473,321
NUT AND BOLT LOCK
Filed Feb. 24, 1923
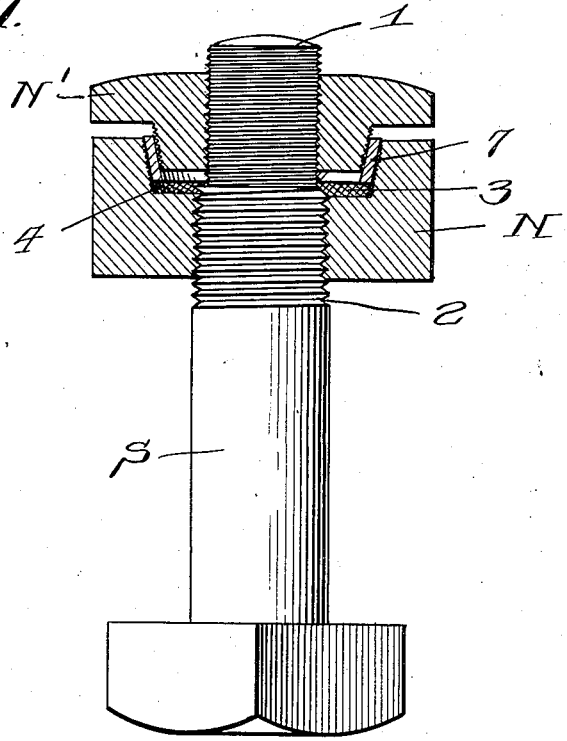
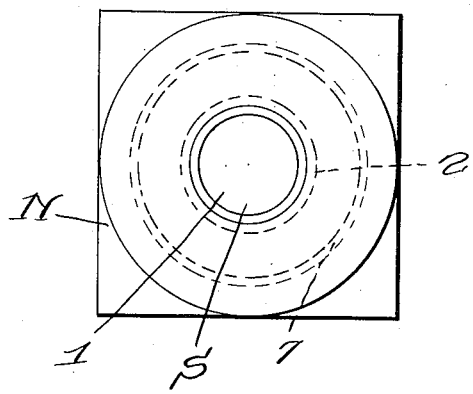
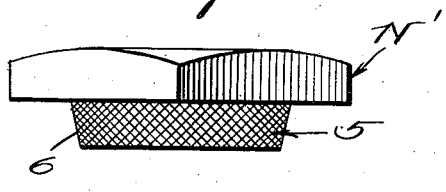
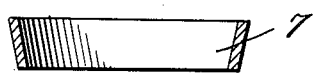
Inventor
Michael R. Rumfelt
By Watson E. Coleman
Attorney Patented Nov. 6, 1923.

1,473,321

UNITED STATES PATENT OFFICE.

MICHAEL R. RUMFELT, OF SOUTH LIMA, NEW YORK.

NUT AND BOLT LOCK.

Application filed February 24, 1923. Serial No. 621,030.

*To all whom it may concern:*

Be it known that I, MICHAEL R. RUMFELT, a citizen of the United States, residing at South Lima, in the county of Livingston and State of New York, have invented certain new and useful Improvements in Nut and Bolt Locks, of which the following is a specification, reference being had to the accompanying drawings.

This invention relates to certain improvements in nut and bolt locks and has relation more particularly to a device of this general character embodying superimposed threaded locked nuts and it is an object of the invention to provide a novel and improved lock of this general character wherein the bolts and nuts are effectively held in applied position irrespective of any vibration to which the same may be subjected.

The invention consists in the details of construction and in the combination and arrangement of the several parts of my improved nut and bolt lock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in elevation and partly in section illustrating a bolt and nut lock constructed in accordance with an embodiment of my invention;

Figure 2 is a view in top plan of the structure as illustrated in Figure 1;

Figure 3 is a view in side elevation of the outer nut; and

Figure 4 is a sectional view of the washer.

As disclosed in the accompanying drawings, S denotes the shank of a bolt having its outer end portion 1 reduced in thickness, said reduction being substantially equal to the depth of the threads on the inner portion 2 of the shank. The threads on the portions 1 and 2 are disposed in the same general direction, with the threads on the outer portion 1 being on a lesser angle than the threads on the portion 2, with said threads on the portion 1 being preferably greater to the inch than the threads on the portion 2.

Engageable with the portion 2 of the shank S is the nut N while the nut N' is engageable with the portion 2 of the shank. The slight reduction in diameter of the portion 1 readily permits the application of the nut N to the portion 2 and by having the threads of the portions 1 and 2 disposed in the same general direction, the nuts N and N' may be applied with convenience and dispatch. By having the threads on the portion 1 different as before described to the threads on the portion 2, should the nut N have a tendency to reverse turning movement it will wedge against the nut N' whereby the maintenance of the nuts in applied position is assured.

The face of the nut N opposed to the applied nut N' has its bore enlarged to provide a socket 3, the wall 4 of which being preferably outwardly beveled or flared. The face of the applied nut N' opposed to the nut N is provided at its axial center with an outstanding annular flange or rib 5 having its peripheral face or wall 6 beveled or flared complemental to the wall 4 of the socket 3. The peripheral face or wall 6 is preferably roughened as is also the wall 4.

7 denotes a washer of malleable iron or other relatively soft material which is adapted to snugly fit within the socket 3 and to have close contact with the wall 4 thereof and to seat between said wall 4 of the socket 3 and the wall 6 of the flange 5 when the nuts N and N' are in working position. This washer 7 prevents the nuts becoming set as by corrosion whereby the removal of the nuts is materially handicapped.

The washer 7 also serves as a grip to offset any tendency of the outer nut N' to loosen.

From the foregoing description it is thought to be obvious that a nut and bolt lock constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination, a shank having an inner threaded portion and an outer reduced threaded portion, a nut engageable with each of said threaded portions, the opposed face of one of said nuts being provided with a socket and the opposed face of the second nut being provided with a flange extending within said socket, and a washer interposed between the outer walls of the socket and the flange.

2. In combination, a shank having an inner threaded portion and an outer reduced threaded portion, a nut engageable with each of said threaded portions, the opposed face of one of said nuts being provided with a socket and the opposed face of the second nut being provided with a flange extending within said socket, and a washer interposed between the outer wall of the socket and the flange, said washer being of soft metal.

3. In combination, a shank having an inner threaded portion and an outer reduced threaded portion, a nut engageable with each of said threaded portions, the opposed face of one of said nuts being provided with a socket and the opposed face of the second nut being provided with a flange extending within said socket, and a washer interposed between the outer wall of the socket and the flange, the threads of both portions of the shank being disposed in the same general direction.

4. In combination, a shank having an inner threaded portion and an outer reduced threaded portion, a nut engageable with each of said threaded portions, the opposed face of one of said nuts being provided with a socket and the opposed face of the second nut being provided with a flange extending within said socket, and a washer interposed between the outer wall of the socket and the flange, the threads on one portion of the shank being arranged on an angle different than the angle of the threads on the second portion.

5. In combination, a shank having an inner threaded portion and an outer reduced threaded portion, a nut engageable with each of said threaded portions, the opposed face of one of said nuts being provided with a socket and the opposed face of the second nut being provided with a flange extending within said socket, and a washer interposed between the outer wall of the socket and the flange, the threads on one portion being greater to an inch than the threads on a second portion.

6. In combination, a shank having an inner threaded portion and an outer reduced threaded portion, a nut engageable with each of said threaded portions, the opposed face of one of said nuts being provided with a socket, the opposed face of the second nut being provided with a flange extending within said socket, and a washer interposed between the outer wall of the socket and the flange, the opposing faces of socket and flange being roughened.

In testimony whereof I hereunto affix my signature.

MICHAEL R. RUMFELT.